US009008316B2

(12) United States Patent
Acar et al.

(10) Patent No.: US 9,008,316 B2
(45) Date of Patent: Apr. 14, 2015

(54) ROLE-BASED DISTRIBUTED KEY MANAGEMENT

(75) Inventors: Tolga Acar, Sammamish, WA (US); Henry N. Jerez, Sammamish, WA (US); Lan Duy Nguyen, Newcastle, WA (US); Thomas Michael Roeder, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 13/434,737

(22) Filed: Mar. 29, 2012

(65) Prior Publication Data
US 2013/0259234 A1 Oct. 3, 2013

(51) Int. Cl.
*H04L 29/06* (2006.01)
*H04L 9/08* (2006.01)

(52) U.S. Cl.
CPC ............ *H04L 9/0816* (2013.01); *H04L 9/0891* (2013.01)

(58) Field of Classification Search
CPC .......................... H04L 9/0891; H04L 9/0816
USPC ................... 380/278, 279, 281, 286, 44, 277
See application file for complete search history.

(56) References Cited

U.S. PATENT DOCUMENTS

| | | | | |
|---|---|---|---|---|
| 5,481,613 A * | 1/1996 | Ford et al. | | 380/30 |
| 5,812,666 A * | 9/1998 | Baker et al. | | 380/277 |
| 5,956,489 A * | 9/1999 | San Andres et al. | | 709/221 |
| 6,594,671 B1 * | 7/2003 | Aman et al. | | 1/1 |
| 6,711,263 B1 * | 3/2004 | Nordenstam et al. | | 380/282 |
| 7,089,211 B1 * | 8/2006 | Trostle et al. | | 705/51 |
| 7,260,224 B1 * | 8/2007 | Ingle et al. | | 380/279 |
| 7,502,927 B2 * | 3/2009 | Trostle et al. | | 713/163 |
| 7,577,258 B2 * | 8/2009 | Wiseman et al. | | 380/281 |
| 7,945,959 B2 * | 5/2011 | Ilechko | | 726/26 |
| 7,957,320 B2 * | 6/2011 | Konig et al. | | 370/254 |
| 7,974,415 B2 * | 7/2011 | Nochta | | 380/277 |
| 7,991,994 B2 * | 8/2011 | Salgado et al. | | 713/155 |
| 7,992,194 B2 * | 8/2011 | Damodaran et al. | | 726/4 |
| 8,037,319 B1 | 10/2011 | Clifford | | |
| 8,046,579 B2 | 10/2011 | Kresina | | |
| 8,064,604 B2 * | 11/2011 | Youn | | 380/277 |
| 8,116,456 B2 * | 2/2012 | Thomas | | 380/277 |
| 8,255,690 B2 * | 8/2012 | Wiseman et al. | | 713/171 |
| 8,291,224 B2 * | 10/2012 | Pelton et al. | | 713/175 |

(Continued)

OTHER PUBLICATIONS

Lu et al., A Framework for a Distributed Key Management Scheme in Heterogeneous Wireless Sensor Networks, Feb.2008, IEEE.*

(Continued)

*Primary Examiner* — David Garcia Cervetti
(74) *Attorney, Agent, or Firm* — Ladislav Kusnyer; Judy Yee; Micky Minhas

(57) ABSTRACT

Implementations for providing role-based distributed key management (DKM) replication are described. A server node receives a request from a requester node to perform a DKM create or update function. The server node determines the role of the requester node based on a public key of the requester node. The server node determines whether the role of the requester node indicates that the requester node is authorized to request the DKM create or update function. If the requester node's role is authorized to request the DKM create or update function, then the server node performs the requested function. The DKM create or update function may involve a replication function. Public key and trust chains may be derived from physical cryptographic processors, such as TPMs.

20 Claims, 13 Drawing Sheets

(56) References Cited

U.S. PATENT DOCUMENTS

| | | | |
|---|---|---|---|
| 8,447,037 B2* | 5/2013 | Noh et al. | 380/277 |
| 8,572,377 B2* | 10/2013 | Kalbratt | 713/168 |
| 2002/0080974 A1 | 6/2002 | Grawrock | |
| 2002/0144117 A1* | 10/2002 | Faigle | 713/169 |
| 2003/0110397 A1* | 6/2003 | Supramaniam et al. | 713/201 |
| 2003/0115313 A1* | 6/2003 | Kanada et al. | 709/223 |
| 2003/0126464 A1* | 7/2003 | McDaniel et al. | 713/201 |
| 2003/0154404 A1* | 8/2003 | Beadles et al. | 713/201 |
| 2004/0193917 A1* | 9/2004 | Drews | 713/201 |
| 2005/0097317 A1* | 5/2005 | Trostle et al. | 713/163 |
| 2005/0166051 A1* | 7/2005 | Buer | 713/173 |
| 2005/0180572 A1* | 8/2005 | Graunke | 380/277 |
| 2006/0072763 A1 | 4/2006 | You et al. | |
| 2006/0136717 A1 | 6/2006 | Buer et al. | |
| 2006/0147043 A1* | 7/2006 | Mann et al. | 380/270 |
| 2006/0236096 A1* | 10/2006 | Pelton et al. | 713/155 |
| 2006/0236363 A1* | 10/2006 | Heard et al. | 726/1 |
| 2006/0291664 A1* | 12/2006 | Suarez et al. | 380/286 |
| 2007/0039039 A1* | 2/2007 | Gilbert et al. | 726/4 |
| 2007/0094719 A1 | 4/2007 | Scarlata | |
| 2007/0116269 A1* | 5/2007 | Nochta | 380/30 |
| 2007/0162750 A1* | 7/2007 | Konig et al. | 713/168 |
| 2007/0220591 A1* | 9/2007 | Damodaran et al. | 726/4 |
| 2007/0230706 A1* | 10/2007 | Youn | 380/277 |
| 2007/0258623 A1* | 11/2007 | McGrath et al. | 382/104 |
| 2008/0022370 A1* | 1/2008 | Beedubail et al. | 726/4 |
| 2008/0065884 A1* | 3/2008 | Emeott et al. | 713/168 |
| 2008/0070577 A1* | 3/2008 | Narayanan et al. | 455/436 |
| 2008/0083011 A1* | 4/2008 | McAlister et al. | 726/1 |
| 2008/0130902 A1* | 6/2008 | Foo Kune et al. | 380/286 |
| 2008/0152151 A1 | 6/2008 | Pourzandi et al. | |
| 2008/0256646 A1 | 10/2008 | Strom et al. | |
| 2008/0263370 A1* | 10/2008 | Hammoutene et al. | 713/193 |
| 2008/0271165 A1 | 10/2008 | Schnell et al. | |
| 2008/0275991 A1* | 11/2008 | Matsuzaki et al. | 709/225 |
| 2008/0307054 A1 | 12/2008 | Kamarthy et al. | |
| 2009/0006862 A1 | 1/2009 | Alkove et al. | |
| 2009/0025063 A1* | 1/2009 | Thomas | 726/4 |
| 2009/0086979 A1* | 4/2009 | Brutch et al. | 380/279 |
| 2009/0092252 A1* | 4/2009 | Noll et al. | 380/277 |
| 2009/0136043 A1* | 5/2009 | Ramanna et al. | 380/281 |
| 2009/0154709 A1 | 6/2009 | Ellison | |
| 2009/0240941 A1 | 9/2009 | Lee et al. | |
| 2009/0249073 A1* | 10/2009 | Wiseman et al. | 713/171 |
| 2009/0254392 A1* | 10/2009 | Zander | 705/7 |
| 2009/0292914 A1* | 11/2009 | Liu et al. | 713/153 |
| 2010/0146295 A1* | 6/2010 | Proudler | 713/189 |
| 2010/0211781 A1* | 8/2010 | Auradkar et al. | 713/168 |
| 2010/0217853 A1* | 8/2010 | Alexander et al. | 709/223 |
| 2010/0303240 A1* | 12/2010 | Beachem et al. | 380/277 |
| 2010/0306554 A1* | 12/2010 | Nunez-Tejerina et al. | 713/193 |
| 2010/0313011 A1 | 12/2010 | Laffey | |
| 2011/0038482 A1 | 2/2011 | Singh et al. | |
| 2011/0040960 A1* | 2/2011 | Deierling et al. | 713/2 |
| 2011/0055560 A1 | 3/2011 | Meissner et al. | |
| 2011/0088087 A1* | 4/2011 | Kalbratt | 726/7 |
| 2011/0103589 A1* | 5/2011 | Tie et al. | 380/282 |
| 2011/0150224 A1* | 6/2011 | Noh et al. | 380/277 |
| 2011/0200026 A1 | 8/2011 | Ji et al. | |
| 2011/0243332 A1 | 10/2011 | Akimoto | |
| 2012/0173885 A1* | 7/2012 | Acar et al. | 713/193 |
| 2012/0300940 A1* | 11/2012 | Sabin et al. | 380/282 |
| 2013/0254529 A1* | 9/2013 | Fu et al. | 713/150 |

OTHER PUBLICATIONS

Tolga Acar, Distributed Key Management and Cryptographic Agility, Feb. 24, 2011, University of Washington, http://www.cs.washington.edu/education/courses/csep590a/11wi/slides/UW%20Lecture%2020110224%20-%20Tolga.pdf.*

Adusumilli et al., DGKD: Distributed Group Key Distribution with Authentication Capability, 2005, IEEE.*

Acar et al., Key Management in Distributed Systems, Microsoft, Jun. 2010.*

Joshi et al., Secure, Redundant, and Fully Distributed KeyManagement Scheme forMobile Ad Hoc Networks: An Analysis, 2005, EURASIP.*

Mukherjee et al., Distributed key management for dynamic groups in MANETs, Apr. 2008, ELSEVIER.*

Lu et al., A Framework for a Distributed Key Management Scheme in Heterogeneous Wireless Sensor Networks, Feb. 2008, IEEE.*

Office Action for U.S. Appl. No. 12/982,235, mailed on Nov. 23, 2012, Acar et al, "Key Management and Data Protection with Trusted Platform Modules", 22 pages.

"Trusted Platform Module," Published on Nov. 17, 2007, obtained from http://www.infineon.com/cms/en/product/channel.html?channel=ff80808112ab681d0112ab6921ae011f, on Sep. 9, 2010, 3 pages.

Vaughan-Nichols, "Windows 7, Security, and the Trusted Platform Module," Published Date: Mar. 22, 2010, obtained from http://itexpertvoice.com/home/windows-7-security-and-the-trusted-platform-module/, on Sep. 9, 2010, 10 pages.

Hewitt, "Trusted Computing and the Trusted Platform Module," Published Date: Apr. 13, 2006, obtained from http://www.cs.hmc.edu/~mike/public_html/courses/security/s06/projects/bill.pdf, 11 pages.

Kauer, "OSLO: Improving the security of Trusted Computing," obtained from http://www.usenix.org/event/sec07/tech/full_papers/kauer/kauer_html/, on Sep. 9, 2010, 12 pages.

McCune et al., "TrustVisor: Efficient TCB Reduction and Attestation," Published Date: Mar. 9, 2009, obtained from http://people.csail.mit.edu/costan/readings/oakland_papers/CMUCylab09003.pdf, 17 pages.

Relph-Knight, "Linux and the Trusted Platform Module (TPM)," Published Date: Sep. 28, 2009, obtained from http://www.h-online.com/open/features/Linux-and-the-Trusted-Platform-Module-TPM-746611.html, 4 pages.

Acar, et al., "Cryptographic Agility and its Relation to Circular Encryption", Europcrypt 2010, Springer Verlag, May 2010, 25 pages.

Michener, et al., "Security Domains: Key Manaement in Large-Scale Systems", IEEE Software, IEEE Computer Society, vol. 17, No. 5, Sep. 2000, pp. 52-58.

Office action for U.S. Appl. No. 12/982,235, mailed on May 14, 2013, Acar et al., "Key Management and Data Protection with Trusted Platform Modules", 25 pages.

Office action for U.S. Appl. No. 12/982,235, mailed on Apr. 22, 2014, Acar et al., "Key Management and Data Protection with Trusted Platform Modules", 22 pages.

Office action for U.S. Appl. No. 12/982,235, mailed on Aug. 22, 2014, Acar et al., "Key Management and Data Protection with Trusted Platform Modules", 23 pages.

* cited by examiner

ROLE-BASED DISTRIBUTED KEY MANAGEMENT

RELATED APPLICATIONS

The present application is related to U.S. application Ser. No. 12/982,235, filed on Dec. 30, 2010, and entitled "KEY MANAGEMENT USING TRUSTED PLATFORM MODULES."

BACKGROUND

Distributed Key Management (DKM) services allow sharing of keys and other functionality. Specifically, a DKM service provides cryptographic key management services for secure data sharing amongst distributed applications (for example, as a supplement to the Windows™ DPAPI™). Some DKM systems may be specifically designed for data centers and cloud services, as well as customer computer clusters and distributed applications. Moreover, a DKM service might handle key rollover and expiration for users. But where the number of nodes in a DKM system is very large—on the order of tens of thousands of nodes—the secure distribution of DKM keys becomes a difficult problem.

Related application, U.S. application Ser. No. 12/982,235, filed on Dec. 30, 2010, and entitled "KEY MANAGEMENT USING TRUSTED PLATFORM MODULES," describes that the security of the DKM keys is rooted in a highly-available but inefficient crypto processor called a Trusted Platform Module (TPM). Asymmetric key pairs are baked into TPMs during manufacture and include storage root keys (SRK). Working keys are stored in working memory of a computing system and are sealed by the $SRK_{pub}$ (the public key of the asymmetric SRK pair stored on the TPM), and the working keys are used to protect the DKM keys stored in memory.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

A DKM system with separation of roles is described. Client nodes perform cryptographic services on behalf of user devices using DKM keys. Master servers form the root of trust in the DKM system. Storage nodes provide key, group, and policy storage, replication, creation, synchronization, and update functions. Client nodes request DKM keys from the storage nodes and provide end-user cryptographic functions using the DKM keys. Administrative nodes request the creation of keys, policies, and groups from the storage nodes.

DKM policies define the functions that the different roles are authorized to perform, and the nodes within the DKM system use lists of public keys signed by the master servers as the basis for node identification and role verification. The DKM nodes also utilize a crypto processor, such as a TPM, to secure communications between nodes, to securely store the DKM keys, and as the source for the public keys used to identify nodes and to verify the nodes' roles within the DKM system.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
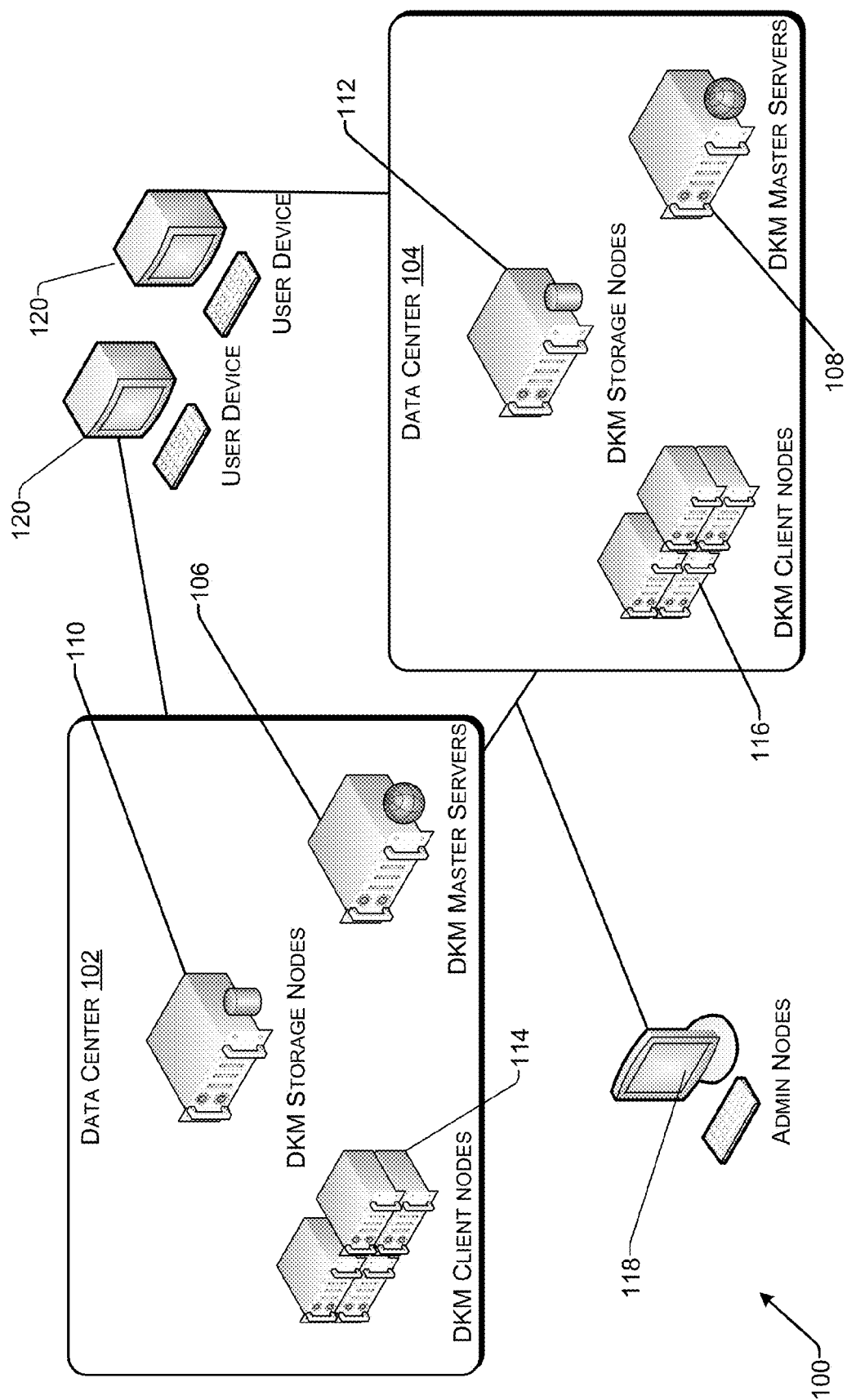
FIG. 1 is a schematic diagram of an example DKM system usable to provide role-based DKM replication.

As discussed above, ensuring the security of a DKM system with a large number of nodes is a difficult problem. This is especially true where the DKM system's integrity is protected by inefficient TPMs deployed in each of the nodes. Embodiments of the present application describe a DKM system that includes a separation of roles to enable the DKM system to scale to large numbers. Master servers form the root of trust in the DKM system. Storage nodes provide key storage, replication, creation, and update functions. Client nodes request DKM keys from the storage nodes and provide end-user cryptographic functions using the DKM keys. Administrative nodes request the creation of keys, policies, and groups from the storage nodes.

Nodes in the DKM system (client nodes, admin nodes, storage nodes, and master servers) enforce role separation within the DKM system by the use of public TPM keys and key lists that identify the nodes' public TPM keys as well as the nodes' designated roles. The key lists include a client node list, a storage server list, and a master server list. A key is list is signed by a key in the master server list. As used herein, TPM keys refers either to those keys that are baked into a TPM or else keys derived from such baked-in keys. Using TPM keys provides secure hardware-based protection, although purely software-based cryptography and keys may be used according to various embodiments. The use of keys to identify DKM nodes and their designated roles makes it difficult for a malicious device to impersonate a DKM node, and using TPM keys makes it even more difficult. The storage nodes verify the identities and roles of the DKM client and admin nodes before providing, creating, or updating keys, policies, and groups on behalf of the admin and client nodes.

The storage nodes also verify the identities and roles of other server nodes before responding to their requests, such as synchronization requests.

Furthermore, in response to creation and update requests from admin nodes, the storage nodes will replicate the created keys, policies, and/or groups with at least one other node prior to providing the updated or created key, policy and/or group to the requester node. The replication may take the form of a "primary backup" process whereby the storage node creates or updates the key/policy/group, transmits it to another storage node, and then provides the created or updated key/policy/group to the requester node upon receipt of confirmation from the other storage node that the created or updated key/policy/group has been stored locally on the other storage node. The replication may take the form of a "two-phase commit" process whereby the storage node requests commitments from one or more other storage nodes that they will accept updates to the key/policy/group, and upon receiving such commitments, updates a key/policy/group and transmits it to the other storage nodes. The storage node provides the created or updated key/policy/group to the requester node.

The separation of roles in the DKM system—as well as the replication of created keys, groups, and/or policies—enables the DKM system to scale to a large number of nodes. For example, the security requirements for the master server nodes are more stringent than are the security requirements for other node types, while their processing requirements are relatively small. With a separation of roles, only a few nodes are designated as master servers (because their processing requirements are relatively small), and a smaller number of servers is easier to appropriately secure than is a relatively larger number of servers. The processing requirements and security requirements for storage nodes are relatively moderate. This allows a relatively moderate number of nodes to be designated as storage nodes. Meanwhile, the processing requirements for client nodes are large, but their security requirements are not as stringent. Thus, separation of roles enables a large number of client nodes to be more easily managed, since such nodes require less stringent security requirements. The use of inefficient but highly-secure TPMs makes securing the nodes easier, since TPMs provide an inexpensive form of hardware-based cryptographic protection. Even though TPMs are relatively inefficient, their cryptographic processing requirements are spread throughout the DKM system, thereby ameliorating to some extent the TPM's relative inefficiency.

Replication of created or updated keys/groups/policies to a small number of other servers with periodic system synchronization is a trade-off in availability and manageability, and thus also enables the DKM system to scale to a large number of servers. If newly created keys, for example, were replicated to all nodes on a network upon creation, the integrity of the system would be high, but the network and processing burden would also be high (especially in a DKM system with a large number of nodes). Replication of newly created or updated keys, groups, and policies to a small subset of the storage nodes provides sufficient levels of data integrity while enabling the system to respond to creation or update requests in an efficient manner. Periodic synchronization in the DKM system enables the system to distribute the newly created keys and policies to those nodes that need them in a systematic manner that avoids flooding the network each time a new key, group, or policy is created.

As used herein, a DKM group policy determines cryptographic properties such as the cryptographic algorithms to use and key lifetimes. Although embodiments described herein refer to TPMs, other crypto processors capable of storing and processing keys may also be used in the same or in similar embodiments. The processes, systems, and devices described herein may be implemented in a number of ways. Example implementations are provided below with reference to the following figures.

Example Environment for Role-based DKM Replication

FIG. 1 is a schematic diagram of an example DKM system 100 usable to provide role-based DKM replication. Aspects of the system 100 may be implemented on various suitable computing device types that are capable of implementing a DKM replication protocol. Suitable computing device or devices may include, or be part of, one or more personal computers, servers, server farms, datacenters, special purpose computers, tablet computers, game consoles, smartphones, combinations of these, or any other computing device(s) capable of storing and executing all or part of a DKM protocol. The various computing devices in system 100 may include a TPM.

The DKM system 100 includes data center 102 and data center 104. Although two data centers are shown in FIG. 1, more data centers may be included in DKM system 100, or only one data center may be present. Data centers 102 and 104 include one or more DKM master nodes 106 and 108, respectively. They also include one or more DKM storage nodes 110 and 112, respectively, as well as one or more DKM client nodes 114 and 116, respectively. The DKM system 100 also includes one or more admin nodes 118. Although data centers 102 and 104 are shown with a small number of representative nodes, embodiments of the present application include data centers with large numbers of nodes, such as tens of thousands of nodes.

The DKM system 100 includes user devices 120 which request cryptographic services from the DKM client nodes 114 and 116. The DKM client nodes 114 and 116 obtain DKM keys from the DKM storage nodes in order to provide the requested cryptographic services to the user devices 120.

The DKM system 100 maintains a separation in roles within the system. Master servers 106 and 108 serve as the authorities for signed lists of TPM public keys and configuration data within the DKM system 100. DKM storage nodes 110 and 112 are the authorities for DKM keys and cryptographic policies within DKM system 100. The DKM client nodes 114 and 116 are the sole providers of user-available cryptographic processing functionality, and are capable of requesting DKM keys and policies from the DKM storage nodes 110 and 112. The administrative nodes 118 request that DKM keys be created or updated by the DKM storage nodes 110. The combination of the signed lists and the policies therefore enable the separation of roles in the network. For example, the nodes in the network enforce the separation of roles using the policies to determine the functions that the different roles are allowed to perform. The nodes also use the signed lists of public keys to verify the identities and roles of other nodes in the network.

Example Protocol Flows for a DKM System

Figure 2:
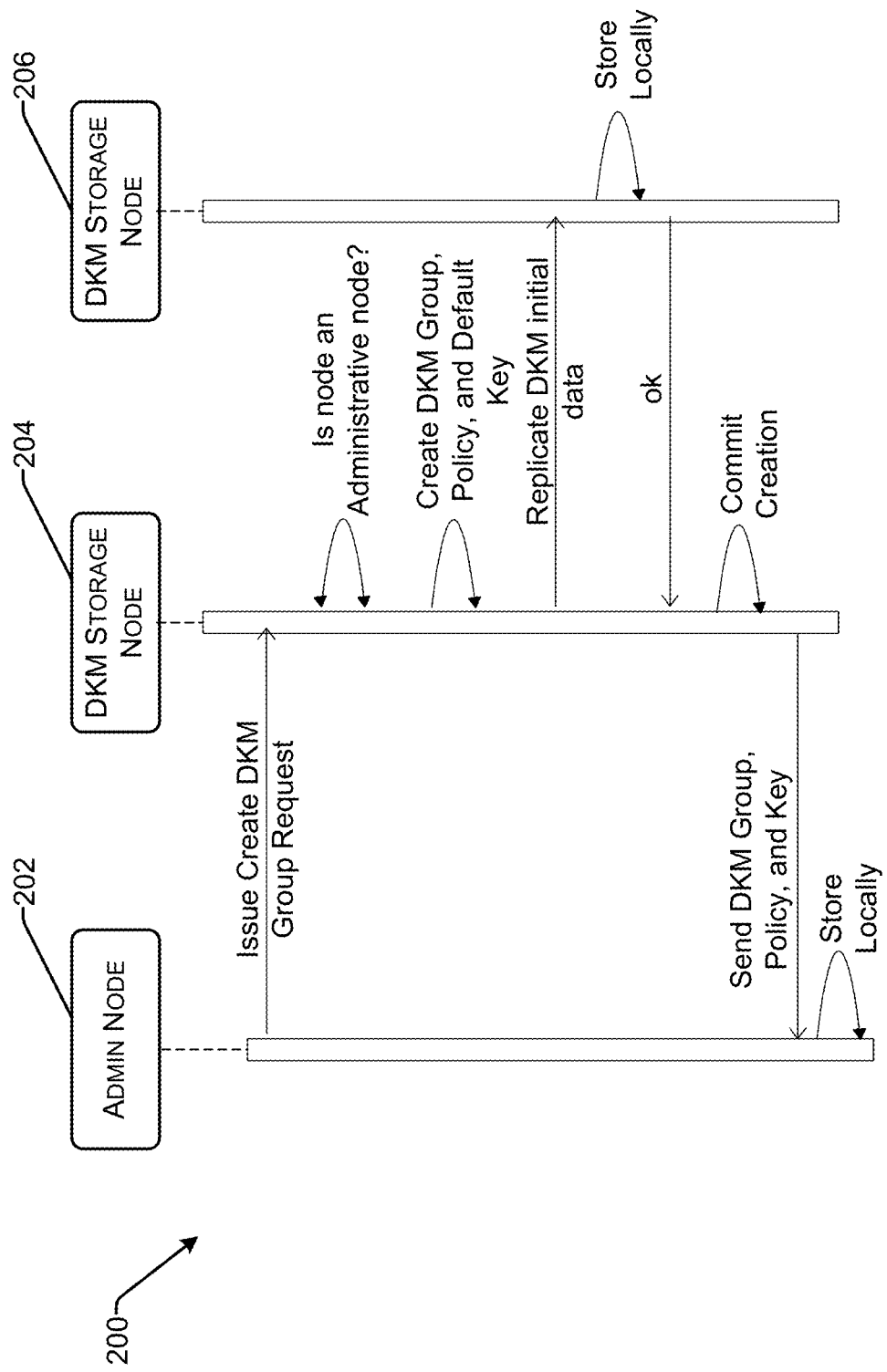
FIG. 2 illustrates an example protocol flow for group creation in a DKM system.

FIG. 2 illustrates an example protocol flow 200 for group creation in a DKM system, such as DKM system 100. Although FIG. 2 illustrates a protocol flow 200 for group creation, various embodiments employ similar protocol flows for key creation, policy creation, as well as key updates, group updates, policy updates, and so forth. FIG. 2 shows a group creation protocol flow only for the purpose of illustration.

An admin node 202, which may be the same as or similar to the admin nodes 118, issues a create DKM group request message to DKM storage node 204, which may be the same as or similar to the DKM storage nodes 110 and/or 112. The admin node 202 determines the identity of the DKM storage node 204 based on a server list signed by a master server. The signed server list primarily includes public keys (such as TPM public keys) for the DKM storage nodes in the DKM system, and roles associated with those TPM public keys. The admin node 202 encrypts the group creation message, such as by using the TPM public key of the DKM storage node 204, or a session key established with the DKM storage node 204 using for example a DKM peer's TPM key pairs. Thus, the public key in the attested server list indicates both the role and identity of the DKM storage node, as well as the information used to securely communicate with the DKM storage node 204.

The DKM storage node 204 receives the group request message, decrypts it, and determines whether the admin node 202 has an administrative role (and thus whether admin node 202 is authorized to request group creation). The DKM storage node 204 determines the role of admin node 202 by reference to a signed client list which includes a list of TPM public keys of those nodes authorized as client nodes in the DKM system, and associated roles for those TPM public keys. The group creation request includes a signature generated by a private key, such as a private TPM key, from the admin node 202. Thus, the DKM storage node 204 can verify the signature using the corresponding public key of the admin node 202 to verify the identity of the admin node 202 and determine, based on whether the corresponding admin node 202 public key is in the client list, whether the admin node 202 is authorized to request group creation.

Upon a determination that the admin node 202 is authorized to request group creation, the DKM storage node 204 creates the DKM group and a corresponding group policy and default group key. Then the DKM storage node 204 sends the DKM group, along with its corresponding group policy and default group key, to DKM storage node 206. The DKM storage node 204 encrypts this message, such as by using a public key, such as a TPM public key, of the DKM storage node 206, or by using a session key established with the DKM storage node 206.

The DKM storage node 206 receives the message, decrypts it, and stores the DKM group initial data. The DKM storage node 206 provides the DKM storage node 204 with verification that the DKM group initial data is replicated on the DKM storage node 206. Then the DKM storage node 204 commits to creation of the DKM group initial data upon receipt of the confirmation, and sends the DKM initial data to the admin node 202. The admin node 202 stores the DKM group initial data.

This "primary backup" procedure during group creation—which is also used during key and policy creation—enables the DKM storage node 204 to respond quickly to the group creation request, while also ensuring that the DKM group initial data is replicated on at least one other server node. The "two-phase commit procedure is used in alternative embodiments. Failure to replicate to at least one other server node may result in loss of the group data if the DKM storage node 204 were to become non-responsive due to network or computer failure. Because of the separation of roles in DKM systems according to embodiments, it is not sufficient that the DKM group initial data is stored locally on the admin node 202. This is because the role of the admin node 202 does not allow it to respond to requests from other client nodes or from other server nodes to provide the DKM group initial data. In other words, the admin node 202 is not included in a signed server list, and is therefore unavailable for requests for group data.

Because DKM keys are created initially without full replication throughout the entire DKM system, the DKM system includes provision for DKM client nodes to request DKM keys from server nodes, and for server nodes to request the keys from each other. An example protocol flow illustrating this process will now be described.

Figure 3:
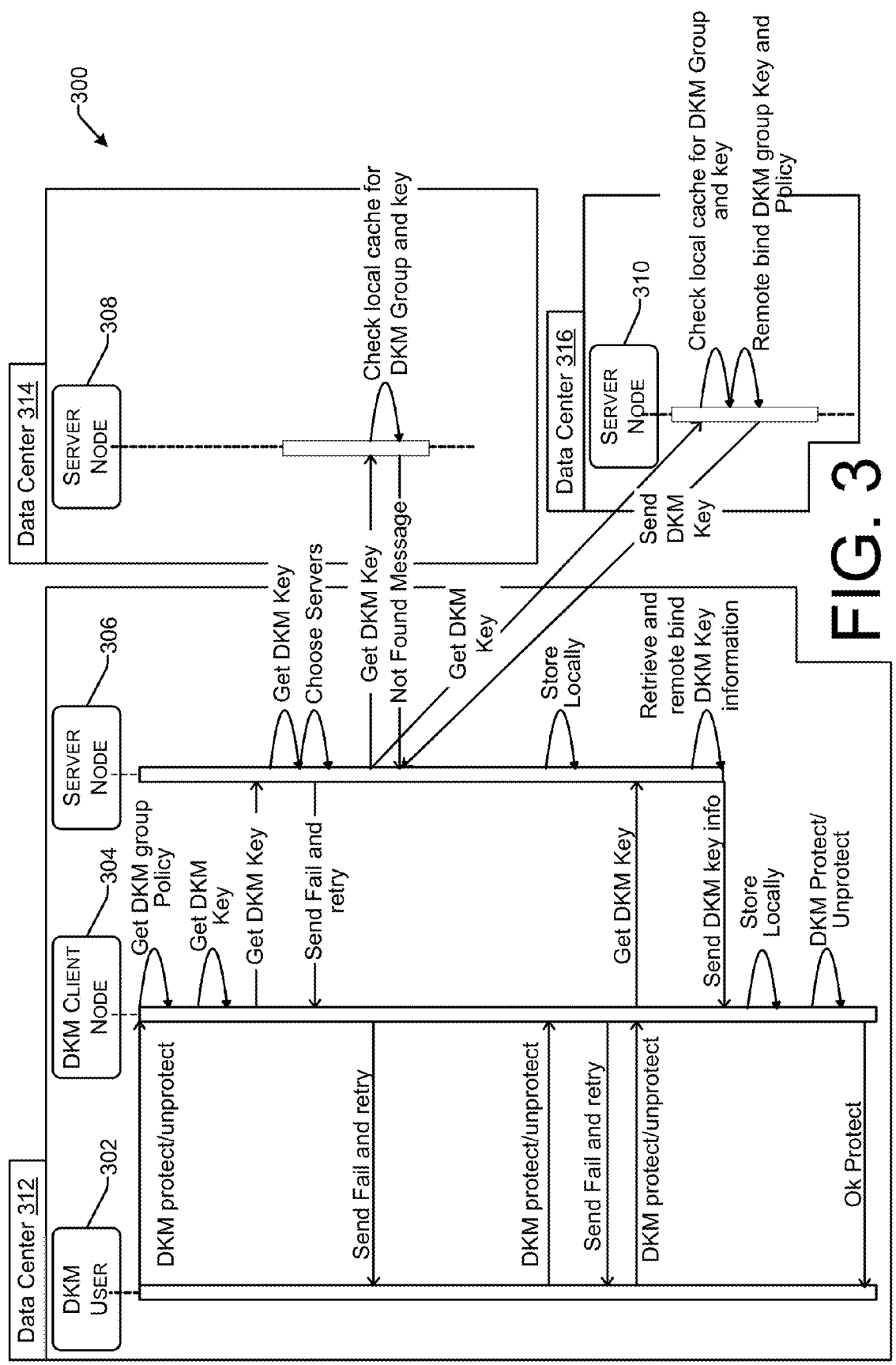
FIG. 3 illustrates an example protocol flow for responding to key requests in a DKM system.

FIG. 3 illustrates an example protocol flow 300 for responding to key requests in a DKM system, such as the DKM system 100. Referring to the top left-hand side of FIG. 3, a DKM user device 302, which may be the same as or similar to the user devices 120, sends a request for a cryptographic service (such as protect/encrypt or unprotect/decrypt) to a DKM client node 304, which may be the same as or similar to the DKM client nodes 114 and 116. The DKM client node 304 receives the request and checks the DKM configuration for the group that the DKM user device 302 belongs to. Assuming that the DKM configuration allows the DKM user device 302 to request the cryptographic service, the DKM client node 304 looks for the appropriate DKM key on its local store. In the example protocol flow 300, the DKM client node 304 does not have the appropriate DKM key stored locally. If it did have the appropriate DKM key stored locally, the DKM client node 304 would use it to perform the requested cryptographic service on behalf of the DKM user device 302.

Because the DKM client node 304 does not have the appropriate DKM key, the DKM client node 304 sends a request for the DKM key to a server node 306 (e.g., a DKM storage node), which may be the same as or similar to the DKM storage nodes 110 and 112. The DKM client node 304 looks up the server node 306 in a server list that is signed by a master server, such as the master servers 106 and 108. The DKM client node 304 may also use the public key, such as the TPM public key, of the server node 306 to protect communication with the server node 306.

The server node 306 receives the request for the DKM key, and performs a look-up to its local store for the DKM key; it may also perform a look-up to a list of known missing keys. In the example protocol flow 300, the server node 306 does not have the requested DKM key in its local store. If the server node 306 did have the requested DKM key stored locally, it would provide it to the DKM client node 304. Instead, the server node 306 selects one or more other server nodes from which to request the DKM key. The server node 306 also sends a fail and retry message to the DKM client node 304 which, in turn, forwards a fail and retry message back to the DKM user device 302.

Server nodes 308 and 310 receive the DKM key request from the server node 306. In the example protocol flow 300, server node 304 is in data center 312, server node 308 is in data center 314, and the server node 310 is in the data center 316. In other examples, the server nodes could be in the same data centers. Server nodes 308 and 310 are shown occupying different data centers for the sake of illustration only.

Server node 308 checks its local store for the requested DKM key and, because it does not have it, sends a not found message back to the server node 306. But server node 310 successfully locates the requested DKM key in its local store. It therefore performs a remote bind operation on the DKM group key and policy, and sends the requested DKM key to the server node 306. The server node 306 stores the DKM key in its local store.

Referring back to the left side of FIG. 3, the DKM user device 302 periodically resends the request for a cryptographic service. Although not shown in FIG. 3, the DKM client node 304 would respond to these subsequent requests by checking its local store, unsuccessfully requesting the DKM key from the server node 306, and sending additional fail and retry messages to the DKM user device 302. But by the time the DKM user device 302 sends its third request for a cryptographic service, the DKM server node 306 has received the requested key from the server node 310. Thus, when the DKM client node 304 requests the DKM key from the server node 306, the server node 306 retrieves the DKM key from its local store, performs a remote bind DKM information, and sends the requested DKM key (along with the related key policy) to the DKM client node 304. The DKM client node 304 stores the DKM key in its local store, and then performs the requested cryptographic service (DKM Protect/Unprotect) on behalf of the user device 302. It transmits an "Ok protect" message to the user device 302 to acknowledge the request and to confirm that the cryptographic service is performed.

Figure 4:
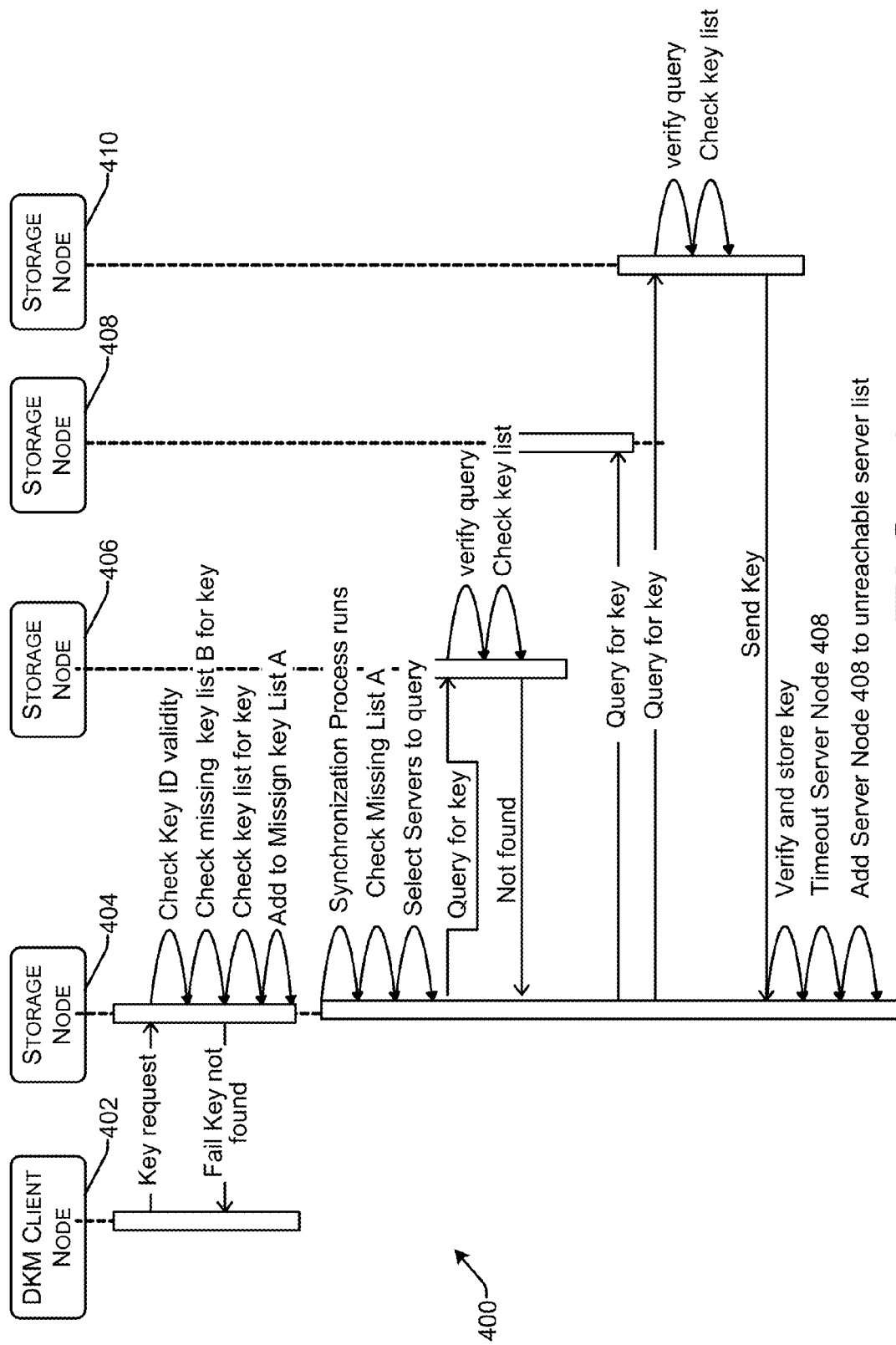
FIG. 4 illustrates an example protocol flow for synchronizing DKM keys in a DKM system.

FIG. 4 illustrates an example protocol flow 400 for synchronizing DKM keys in a DKM system, such as DKM system 100. Referring to the top left-hand side of FIG. 4, a DKM client node 402 requests a DKM key from a storage node 404. This DKM key request may be in response to a request from a user device, such as user devices 120, to perform a cryptographic service. In the example protocol flow 400, the storage node 404 does not have the requested DKM key stored locally. The storage node 404 checks for the validity of the key ID (the key is requested based on a key ID). A key ID may contain intrinsic information that allows the key to be checked for validity using hashes or a predefined key ID formatting. Upon a determination that the key ID is valid, the storage node 404 checks a "missing key list B" that includes a list of DKM keys that are not to be searched for (such as because there have been a certain threshold number of unsuccessful attempts to locate the keys on the list). Upon determining that the requested DKM key is not on the missing key list B, the storage node 404 searches its local store for the requested DKM key. But because the requested DKM key is not stored locally, the storage node sends a failure message to the DKM client node 402. At this point, the storage node 404 may undergo a similar process as is depicted in FIG. 3, requesting the DKM key from other storage nodes. Unlike the example depicted in FIG. 3, however, the storage node 404 is not successful in obtaining the requested DKM key and the DKM key ID is added to a "missing key list A", which includes keys that cannot be found, but that have not yet been added to the missing key list B.

Periodically, the storage node 404 runs a synchronization process. Upon doing so, the storage node 404 checks the missing key list A for missing keys, and selects other servers to query for the keys in missing key list A. In the example protocol flow 400, the previously requested DKM key is added to missing key list A, so the storage node 404 requests the DKM key from storage nodes 406, 408, and 410.

Storage nodes 406 and 410 receive the synchronization requests and verify the query. Verifying the query includes verifying the identity of the storage node 404 (such as by using a public key, such as a TPM public key and comparing it to a signed server list) and determining that it has a designated role that is authorized to perform synchronization requests (based for example on a DKM policy).

Upon verifying the query, the storage node 406 checks its local key list and, because the requested DKM key is not stored therein, the storage node returns a not found message to the storage node 404.

Upon verifying the query, the storage node 410 checks its local key list and, because the requested DKM key is stored therein, the storage node sends the requested DKM key to the storage node 404.

In the example shown in FIG. 4, the storage node 404 does not receive a reply of any kind from the storage node 408.

Upon receiving the requested DKM key from the storage node 410, the storage node 404 verifies that the requested DKM key is the requested DKM key (such as based on its key ID). After a predetermined time period, the storage node 404 times out the request sent to the server node 408 and adds server node 408 to a list of unreachable servers, so as for example to reduce the number of attempts to reach nodes that are suspected to be faulty. At this point, though not shown in the protocol flow 400, the storage node 404 can respond to a future request from the DKM client node 402 by providing the requested DKM key.

The nodes in a DKM system according to embodiments use signed server lists to determine the storage nodes and the master servers within the DKM system. In a large DKM system, storage nodes will periodically be taken offline, or suffer a failure that makes them unreachable. Thus, the master servers periodically run a server update process.

Figure 5:
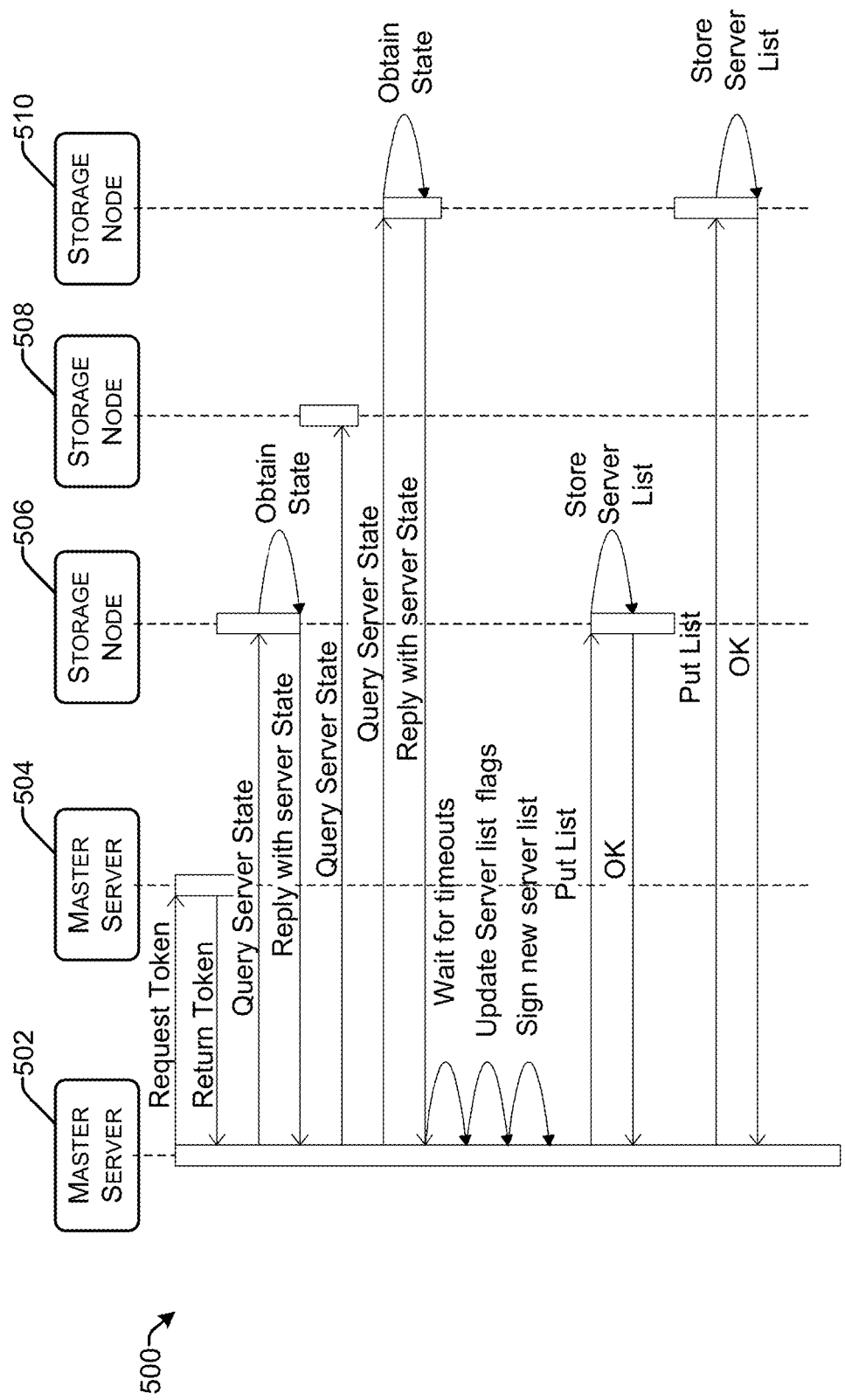
FIG. 5 illustrates an example protocol flow for updating and signing server lists.

FIG. 5 illustrates an example protocol flow 500 for updating and signing the server lists. Referring to the top left-hand side of FIG. 5, a master server 502 periodically performs a server list update process. As part of that process, the master server 502 requests a token from the master server 504. The master server 504—upon verification of the master server 502 role and identity (such as based on a public key, such as a TPM public key of the master server 502 and a signed server list)—returns the requested token to the master server 502. Because only one master server can have the token at any one time, only one master server is able to perform the server list update process.

Upon receiving the token from the master server 502, the master server 504 obtains control of the server list update process. The master server 502 requests server state information from the storage nodes 506, 508, and 510. The master server 502 may obtain the list of storage nodes 506, 508, and 510 from the current version of the server list.

The storage nodes 506 and 510 receive the server state requests from the master server 502. They obtain their respective states, and reply back to the master server 502 with their respective states. The storage node 508 either does not receive the request or suffers from some other failure condition and therefore does not reply to the server state request. After a timeout period with no response from the storage node 508, the master server 502 updates the server list, including flagging the storage node 508 as unreachable (or removes it from the list) and signs the server list. It then issues a put list command to the storage nodes 506 and 510, but not to the storage node 508 since it is unreachable. The storage nodes 506 and 510 store the new signed server list, store it locally, and confirm to the master server 502 that they have received and saved the signed list. In embodiments, the storage nodes update their unreachability information with this list.

Example DKM Client Node

Figure 6:
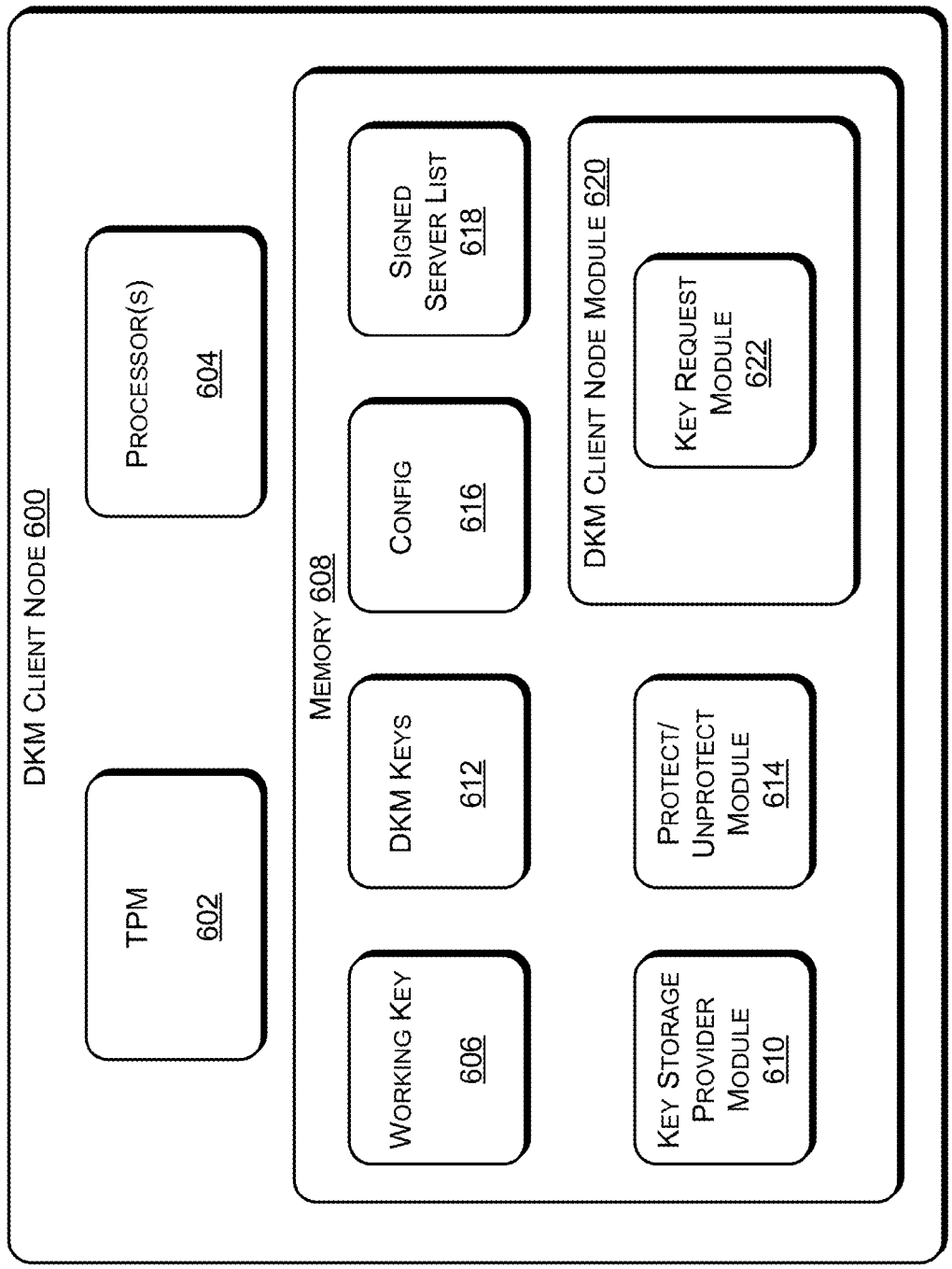
FIG. 6 is a block diagram of an example DKM client node according to various embodiments.

FIG. 6 is a block diagram of an example DKM client node 600 according to various embodiments. The DKM client node 600, which may be the same as or similar to the DKM client nodes 114 and 116, includes a TPM 602 and one or more processors 604. The TPM 602 includes various TPM key pairs (public and private) stored securely within. The TPM 602 is also configured to perform cryptographic functions with those TPM keys, including encrypting and decrypting a working key 606 that is stored decrypted within memory 608. A key storage provider module 610 utilizes the TPM-protected working key 606 to encrypt and decrypt DKM keys 612. The DKM keys 612 may be stored as encrypted within memory 608 until they are needed. The DKM keys 612 are encryption keys usable by the protect/unprotect module 614 to provide cryptographic services to user devices, such as user devices 120.

Memory 608 also includes a DKM configuration file 616 and a signed server list 618, which may have timestamps that enable the DKM client node 600 to select a most recent list. DKM configuration file 616 includes roles for nodes in the DKM system, thereby determining the actions that the nodes are allowed to perform. The signed server list 618 includes TPM public keys for servers, such as the DKM storage nodes 110 and 112 and the DKM Master Nodes 106 and 108. The signed server list 618 is signed by a master server whose TPM public key is included in the signed server list 618. Because the signed server list 618 is self-authenticating (i.e., the key used to authenticate the list is included within the list), the master server is the sole basis of trust in a DKM system. For the DKM system to be secure, the master server therefore has more stringent security requirements than other nodes in the DKM system. This is because all trust in the DKM system derives from the master server. The sole basis for validating the identity and role of a master server is the signed server list which comes from a master server.

The DKM client node module 620 performs various DKM client node functions. For example, the key request module 622 requests DKM keys from storage nodes. The DKM client node module 620 protects communication with the storage nodes. The DKM client node module 620 stores the received DKM keys with the DKM keys 612, thereby making them available for the protect/unprotect module 614 to use.

Example DKM Admin Node

Figure 7:
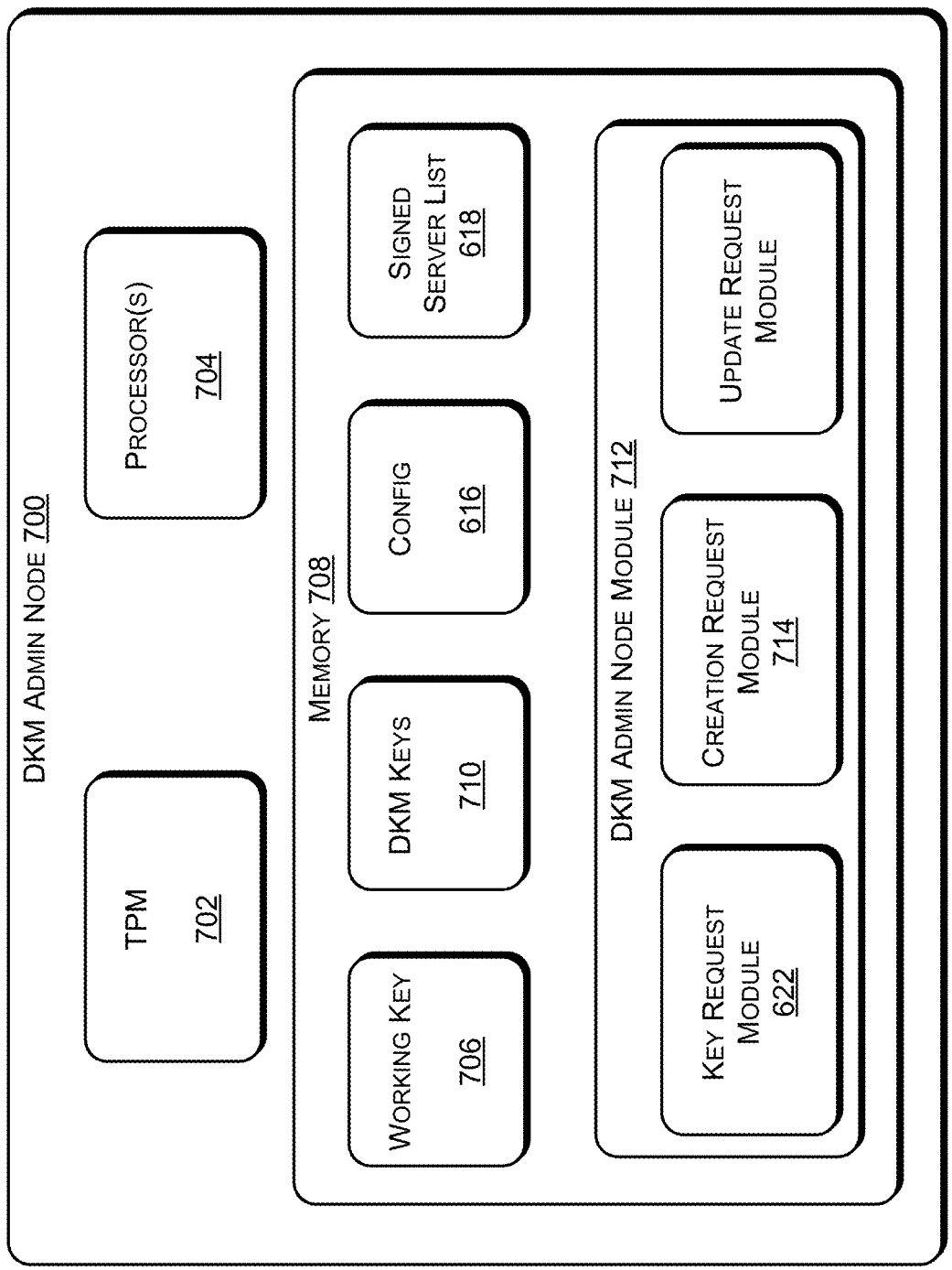
FIG. 7 is a block diagram of an example DKM admin node according to various embodiments.

FIG. 7 is a block diagram of an example DKM admin node 700 according to various embodiments. The DKM admin node 700, which may be the same as or similar to the admin nodes 118, includes a TPM 702 and one or more processors 704. The TPM 702 includes various TPM key pairs (public and private) stored securely within. The TPM 702 is also configured to perform cryptographic functions with those TPM keys, including encrypting and decrypting a working key 706 that is stored decrypted within memory 708. The DKM keys 710 may be encrypted using the working key 706 and stored within memory 708. The DKM keys 710 are encryption keys usable to provide cryptographic services to user devices, such as user devices 120. Memory 708 also includes the DKM configuration file 616 and a signed server list 618.

Memory 708 includes a DKM admin node module 712, which performs the various functions of an admin node within the DKM system. The DKM admin module 712 may include the key request module 622. A creation request module 714 requests the creation of keys, groups, and policies from a DKM storage node, such as the DKM storage nodes 110 and 112. The update request module 716 requests the update of keys, groups, and policies from a DKM storage node.

Example DKM Storage Node

Figure 8:
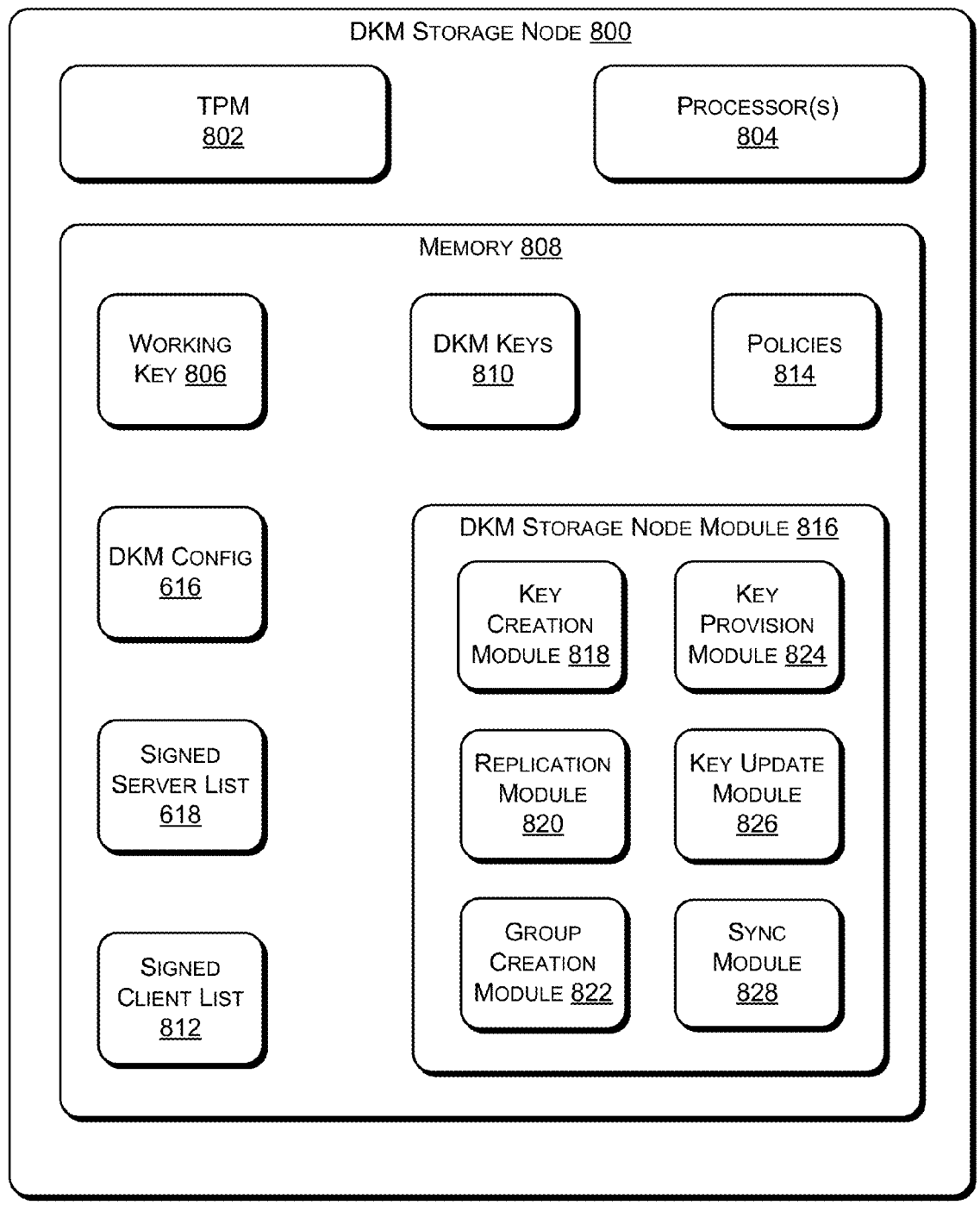
FIG. 8 is a block diagram of an example DKM storage node according to various embodiments.

FIG. 8 is a block diagram of an example DKM storage node 800 according to various embodiments. The DKM storage node 800, which may be the same as or similar to the DKM storage nodes 110 and 112, includes a TPM 802 and one or more processors 804. The TPM 802 includes various TPM key pairs (public and private) stored securely within. The TPM 802 is also configured to perform cryptographic functions with those TPM keys, including encrypting and decrypting a working key 806 that is stored decrypted within memory 808. The DKM keys 810 may be encrypted using the working key 806 and stored within memory 808. The DKM keys 810 are encryption keys usable to provide cryptographic services to user devices, such as user devices 120. Memory 808 also includes the DKM configuration file 616 and a signed server list 618. Memory 808 includes signed client list 812, which is signed by a master server. The signed client list 812 includes TPM public keys for all nodes within the DKM system authorized to perform client node and admin node functions. The signed client list 812 may be stored decrypted within the memory 808.

Memory 808 also includes DKM policies 814 that define key and group policies for the DKM system. The DKM policies 814 include pointers to the DKM keys 810 that are associated with particular groups and policies.

The DKM storage node module 816 performs various functions of a DKM storage node within a DKM system. A key creation module 818 is executable by the one or more processors 804 to create a DKM encryption key on behalf of a requester node, such as a client node or an admin node. The key creation module 818 performs the key creation upon a verification of the identity of the requester node and a determination that the requester node is authorized to request key creation. The identity verification and role determination are determined based on key list of authorized requesters, such as the public TPM keys in the signed client list 812. For example, the request to create a key may be accompanied by a signature using a private TPM key of the requester node. The public TPM key that is paired with the private TPM key of the requester node, and which is included in the signed client list, is usable to verify the signature of the requester node and thus verify that the identity of the requester node. The signed client list 812 indicates the role of the requester node, for example the admin node role, thereby indicating that the requester node is authorized to request key creation (based for example on the policies 814).

A replication module 820 is executable by the one or more processors 804 to initiate replication of the DKM encryption key on one or more other server nodes. The replication module 820 selects the one or more other server nodes based on the signed server list 618. The key creation module 818 is further executable to provide the encryption key to the requester node upon receipt of confirmation that the DKM encryption key is replicated on the one or more other server nodes.

A group creation module 822 is executable by the one or more processors to create a group on behalf of a requester node upon a determination that the requester node is authorized to request group creation. The group creation module 822 is further executable to provide the group to the requester node upon confirmation of replication, by the replication module 820, of the group on the other server node.

A key provision module 824 is executable by the one or more processors to receive a request from another requester node, such as a client node, to provide a DKM encryption key. The key provision module 824 will determine whether the requested key is stored locally on the DKM storage node 800 and request the DKM encryption key from one or more other server nodes upon a determination that the other encryption key is not stored on the DKM storage node 800. The key provision module 824 will also verify the identity and the role of the requester node prior to providing the requested DKM encryption key.

A key update module 826 is executable by the one or more processors to update a DKM encryption key on behalf of a requester node upon verifying the identity of the requester node and determining that the requester node is authorized to request key updates. The replication module 820 replicates the updated key, and an accompanying policy, to one or more other server nodes and the key update module 826 provides the updated key and associated updated policy to the requester node once the other server nodes confirm that they have locally replicate the updated key and policy.

A synchronization module 828 is executable by the one or more processors to synchronize DKM encryption keys with the one or more other server nodes. The synchronization module 828 runs a periodic synchronization process. The synchronization process may search for keys listed on a missing keys list, such as the missing key list A described with reference to FIG. 4. The synchronization process may be triggered based on a version number of an updated encryption key. For example, the synchronization process may be triggered where a key and an associated policy are updated, and the version number of the policy indicates that other servers have an outdated version of the key and policy. The synchronization module 828 also responds to synchronization requests from other storage nodes, verifies their identity and roles based on their TPM public keys and the signed server list 618, and provides any requested DKM encryption keys that it has stored locally, and stores any DKM encryption keys provided by the other storage nodes.

The replication module 820 is also executable to receive incoming requests from other storage nodes to replicate DKM encryption keys, groups, and policies created or updated on the other storage nodes onto the DKM storage node 800. The replication module 820 verifies the identity and the role of the other storage nodes, such as by reference to the signed server list 618, and upon successful verification of the identity and role, replicates the keys, groups, and policies in memory 808. The replication module 820 provides confirmation to the other storage node that the DKM encryption keys, groups, and policies are replicated locally. This enables the other storage node to confirm creation or update of the DKM encryption keys to the admin and/or client nodes.

Example Master Server

Figure 9:
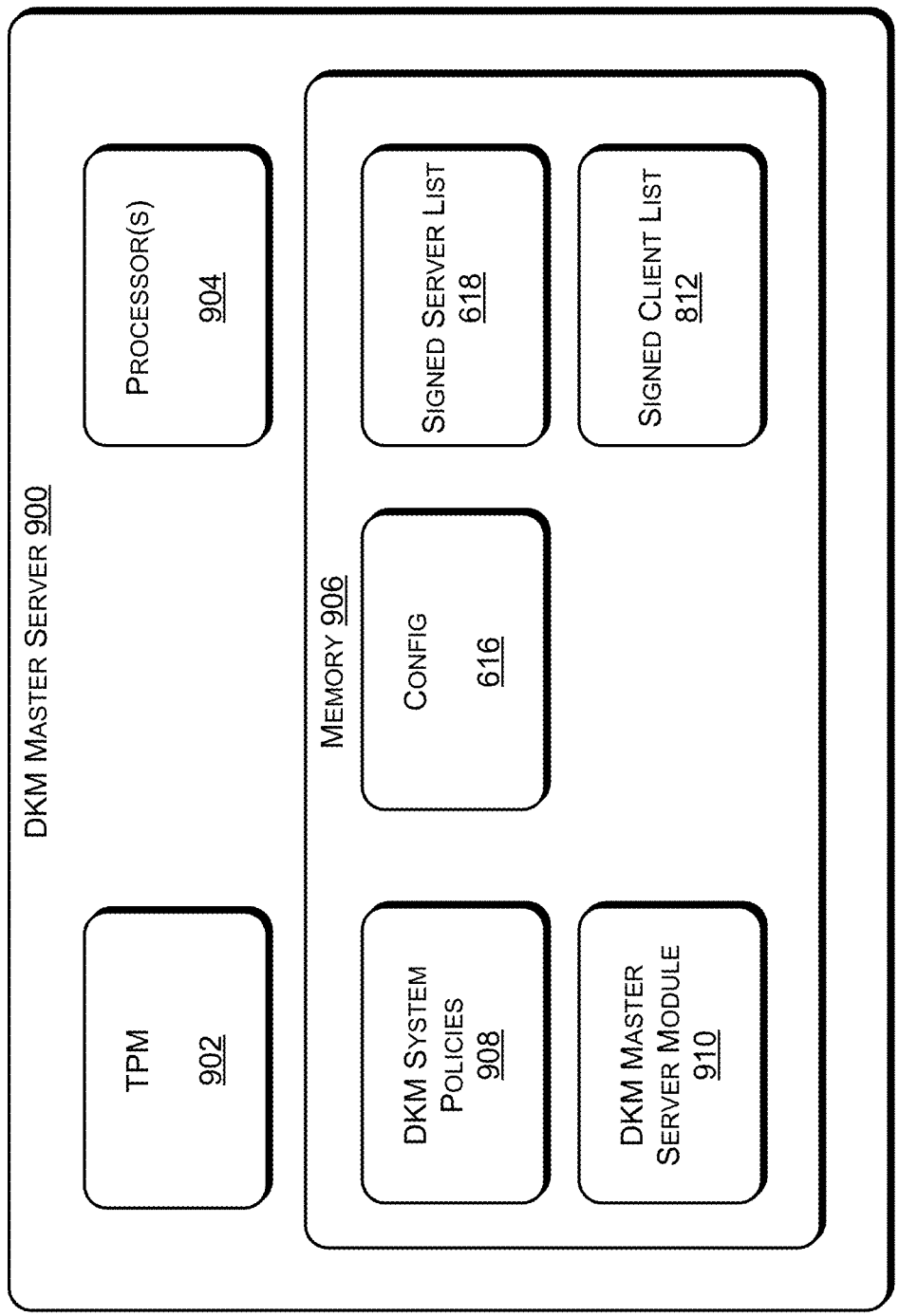
FIG. 9 is a block diagram of an example DKM master server according to various embodiments.

FIG. 9 is a block diagram of an example DKM master server 900 according to various embodiments. The DKM master server 900, which may be the same as or similar to the DKM master servers 106 and 108, includes a TPM 902 and one or more processors 904. Memory 906 includes DKM system policies 908 and DKM system configuration files 616. The memory 906 includes a signed server list 618 and a signed client list 812. A DKM master server module 910 is executable by the one or more processors 904 to perform various DKM master server functions within a DKM system.

The DKM master server module 910 performs client list updates, including receiving TPM keys of new client nodes, adding them to the list, signing the new list, and providing the updated signed client list to the other nodes in the DKM system. The DKM master server module 910 performs periodic server list updates, including requesting tokens from other master servers in the DKM system, querying the storage nodes for status, updating and signing the server list, and providing it to the other nodes in the DKM system.

Example Computing Device

Figure 10:
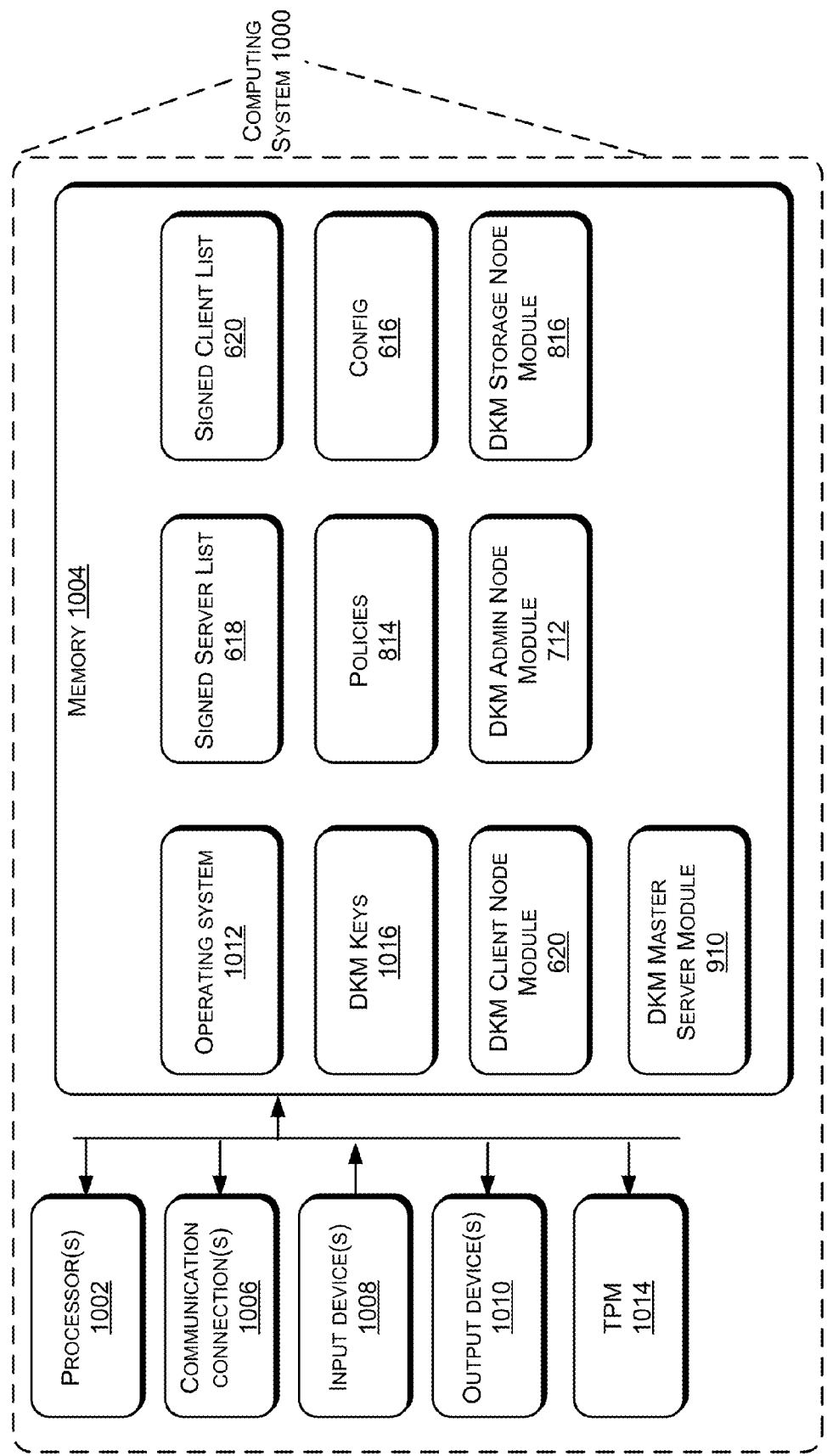
FIG. 10 is a block diagram of an example computing system usable to provide DKM system functions according to embodiments.

FIG. 10 is a block diagram of an example computing system 1000 usable to provide DKM system functions according to embodiments. The computing system 1000 may be configured as any suitable computing device capable of implementing any of the various DKM system functions. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of the DKM system.

In one example configuration, the computing system 1000 comprises one or more processors 1002 and memory 1004. The computing system 1000 may also contain communication connection(s) 1006 that allow communications with various other systems. The computing system 1000 may also include one or more input devices 1008, such as a keyboard, mouse, pen, voice input device, touch input device, etc., and one or more output devices 1010, such as a display, speakers, printer, etc. coupled communicatively to the processor(s) 1002 and memory 1004.

Memory 1004 may store program instructions that are loadable and executable on the processor(s) 1002, as well as data generated during execution of, and/or usable in conjunction with, these programs. In the illustrated example, memory 1004 stores an operating system 1012, which provides basic system functionality of the computing system 1000 and, among other things, provides for operation of the other programs and modules of the computing system 1000.

The computing system 1000 includes a TPM 1014, which may be the same as or similar to TPMs 602, 702, 802, and 902. Depending at least in part on the role that the computing system 1000 performs within a DKM system (e.g., client node, admin node, storage node, or master server), memory 1004 may include one or more of signed server list 618, signed client list 812, DKM keys 1016 (which may be the same as or similar to DKM keys 612, 710, and 810), policies 814, configuration 616, DKM client node module 620, DKM admin node module 712, DKM storage node module 816, and DKM master server module 910.

Example Operations for DKM Key Update or Creation

Figure 11:
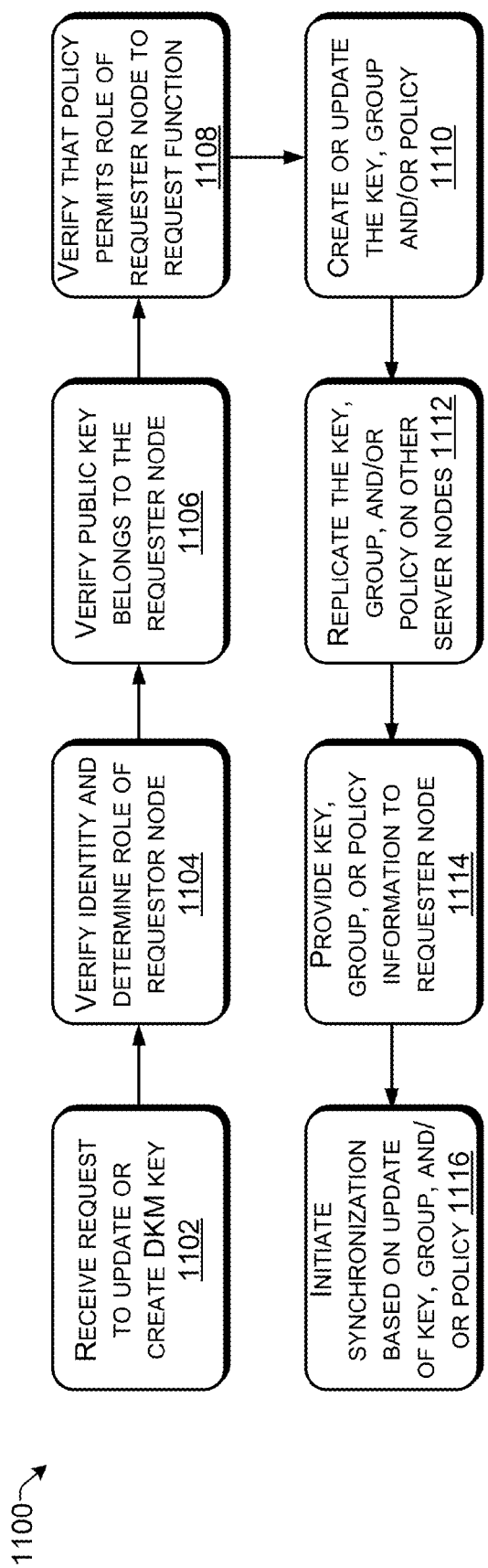
FIG. 11 is a flow diagram showing an example process for updating or creating DKM keys.

FIG. 11 is a flow diagram showing an example process 1100 for updating or creating DKM keys. At 1102, a server node, such as the DKM storage nodes 110 and 112, receive a request from a requester node to perform a DKM create or update function. The requester node may be an admin node, such as the admin nodes 118. The create or update function may be for an encryption key, a group, and/or a policy that is associated with the encryption key or group.

At 1104, the server node determines the role of the requester node. The role of the requester node is based on a public key of the requester node. This includes verifying that a public key of the requester node is included in a public key list of nodes that are designated to perform the role. For example, the server node determines the role of the requester node based on a key, such as a TPM public key, of the requester node being present in a client list signed by a master server. The master server has a master server public key (which may be a TPM key) that is in a separate list of server nodes. The list of server nodes is also signed by the master server.

At 1106, the server node verifies that the public key belongs to the requester node based on a cryptographic signature that accompanies the request. The cryptographic signature is signed by the requester node using a private key that corresponds to the public key present in the signed client list. This verifies the identity of the requester node. Together with the identity determination at 1104, the server node confirms both the identity and the role of the requester node, and may proceed with the request based on the DKM policy.

At 1108, the server node verifies that the DKM policy permits the role of the requester node to request the create or update function. Thus, the signed client list permits the role and the identity of the requester node to be verified, and the policy determines whether the requester node is permitted, based on its role and/or identity, to request the update or create function.

At 1110, the server node creates or updates the key, group, and/or policy. At 1112, the server node replicates the created or updated key, group, and/or policy with one or more other server nodes. This is the "primary backup" process. At 1114, the server node, upon receiving confirmation from the other server nodes, that the key, group, and/or policy are updated, provides the same to the requester node.

At 1116, the server node initiates a synchronization process with other server nodes based on the update of the key, group, and policy. For example, the update of a key and policy may generate a new version number, and the server node may initiate a synchronization process based on the new version number. The server node selects the servers to synchronize with (based for example on one or more of a signed server list and an unreachable servers list), and transmits a synchronization request to those servers.

Example Operations for Synchronization

Figure 12:
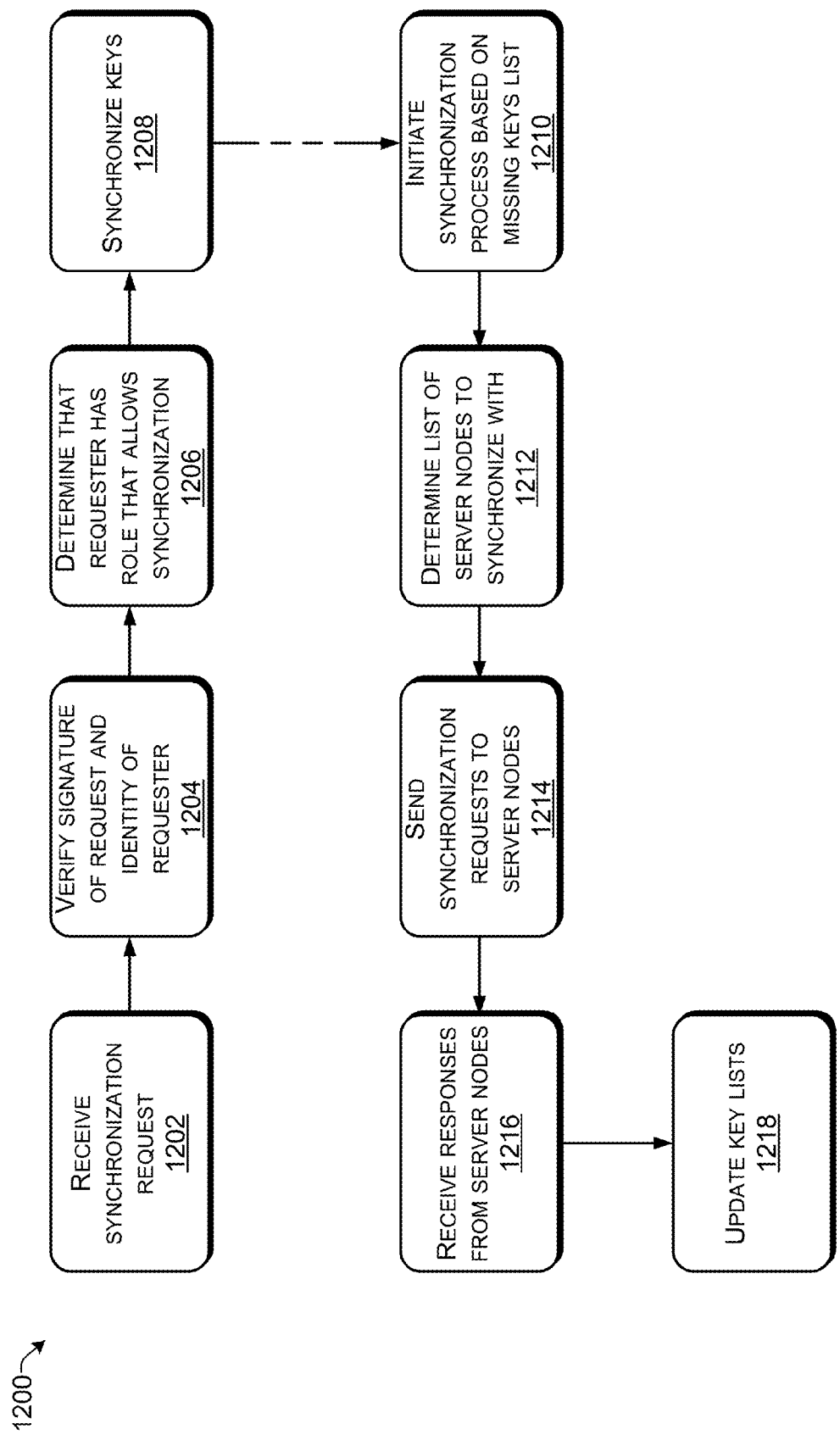
FIG. 12 is a flow diagram showing an example process for synchronizing between server nodes.

FIG. 12 is a flow diagram showing an example process 1200 for synchronizing between server nodes. At 1202, a server node receives from a requester node, a request to synchronize one or more encryption keys. The request includes a signature generated by the requester node. The signature may be based on private key of the requester node, such as a TPM key of the requester node.

At 1204, the server node verifies the signature of the request using the public key of the requester stored in a list of public keys, such as TPM keys, signed by a master server. The list of public keys may be a signed server list, and the requester node may be a storage node. Successfully verifying the signature verifies the identity of the requester node.

At 1206, the storage node determines that the requester node has a role that allows it to request synchronization. For example, the presence of the requester node's TPM public key on a signed server list indicates that the storage node has a server role, and the signed server list may also indicate that the requester node is a storage node in particular. The storage node may also refer to a DKM policy to determine that the role identified in the signed server list is authorized to request synchronization.

At 1208, the storage node synchronizes one or more encryption keys, and with the requester node upon a determination that the requester node is authorized to request synchronization. Thus, by verifying the identity and role of the requester node, the storage node is able to respond to the synchronization request in a secure manner.

The storage node is also configured to initiate its own synchronization requests. For example, at 1210, the storage node periodically initiates synchronization processes, including determining one or more other keys in a list of missing keys. The keys in the missing key list are keys that have one or more previous failed retrieval attempts.

At 1212, the storage node determines a list of server nodes with which to synchronize. At 1214, the storage node sends synchronization requests to those server nodes, including a list of keys requested from this missing key list.

At 1216, the storage node receives responses from the server nodes. The responses may be the requested keys, or messages that indicate that the keys could not be found. At 1218, the storage node updates its list of encryption keys. It may also update a missing keys list B, which indicates keys that are not to be searched for based on reaching a threshold number of failed search attempts. The storage node may update its missing key list A by removing found keys.

Example Operations for Server List Update

Figure 13:
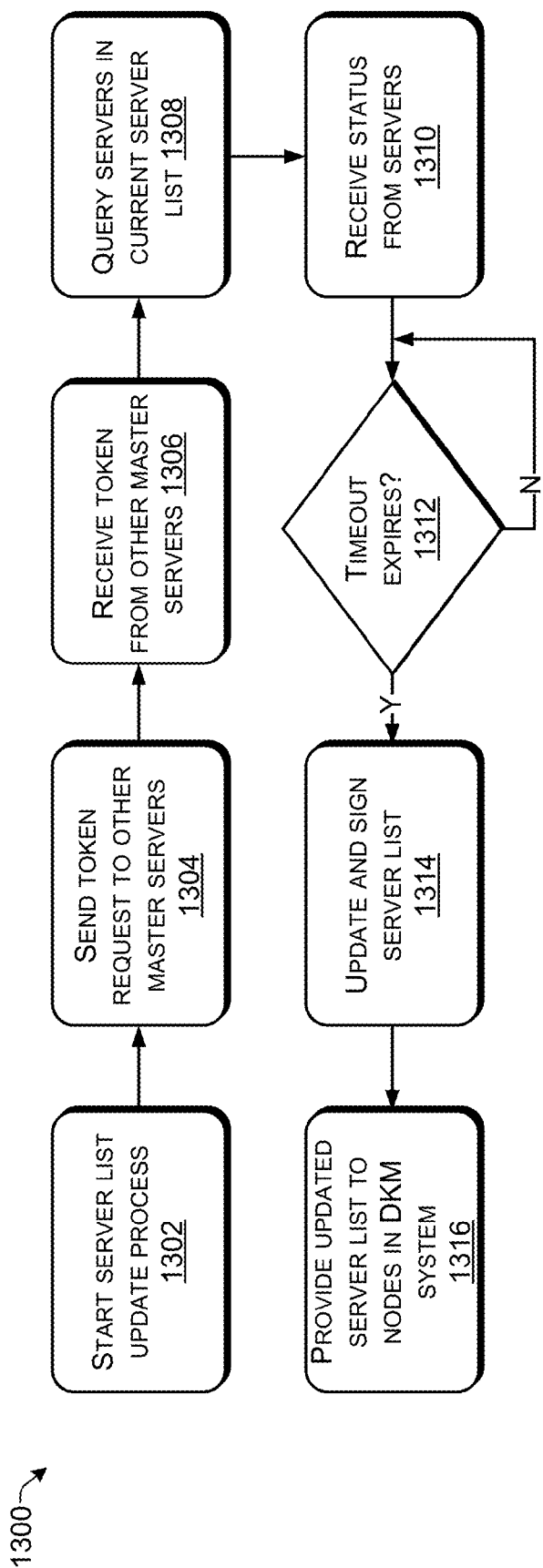
FIG. 13 is a flow diagram of example process for updating a signed server list.

FIG. 13 is a flow diagram of example process 1300 for updating a signed server list. At 1302, a master server—such as the DKM master servers 106 and 108—starts a server list update process. The update process may occur periodically, or based on some event such as the addition of a new server.

At 1304, the master server sends a token request to one or more other master servers. Requesting a token ensures that the master server has control of the server list update process and that no other master servers initiate a competing update process at the same time. A master server may refuse to provide a token, such as if another master server already has control of the token. This prevents the creation of conflicting server lists.

At 1306, the master server receives the token from the other master servers. At 1308, the master server queries the servers in the current signed server list. At 1310, the master server receives server status messages from the servers. At 1312, the master server determines that a timeout period has expired. At 1314, the master server updates and signs the server list. Updating the server list may include flagging any servers that did not respond to the status requests, and unflagging any servers that do respond to the status requests. At 1316, the master server provides other nodes in the DKM system with the updated signed server list.

FIGS. 11-13 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, one or more of memories 608, 708, 808, 906, and 1004 may include volatile memory (such as random access memory (RAM)) and/or non-volatile memory (such as read-only memory (ROM), flash memory, etc.). Memories 608, 708, 808, 906, and 1004 may also include additional removable storage and/or non-removable storage including, but not limited to, flash memory, magnetic storage, optical storage, and/or tape storage that may provide non-volatile storage of computer-readable instructions, data structures, program modules, and other data.

Memories 608, 708, 808, 906, and 1004 are examples of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Conclusion

Although the disclosure uses language that is specific to structural features and/or methodological acts, the invention is not limited to the specific features or acts described. Rather, the specific features and acts are disclosed as illustrative forms of implementing the invention.

What is claimed is:

1. A method comprising:
   receiving, by a server node, a request from a requester node to create an encryption key;
   creating, by the server node, the encryption key in response to at least a determination that the requester node is authorized to request creation of the encryption key;
   initiating replication of the encryption key on one or more other server nodes; and
   providing the encryption key to the requester node upon receiving confirmation that the encryption key is replicated.

2. The method of claim 1, further comprising determining, by the server node, that a role of the requester node is authorized to request creation of the encryption key, wherein the determining the role of the requester includes verifying that a public key of the requester is included in a public key list of nodes designated to perform the role.

3. The method of claim 2, wherein the public key list of nodes is signed by a master server having a master server public key in a separate list of server nodes that is also signed by the master server.

4. The method of claim 1, further comprising:
   receiving, by the server node, another request to update or create one or more of a group or a cryptographic policy;
   creating or updating one or more of the group or the cryptographic policy; and
   replicating one or more of the created or updated group or cryptographic policy on another server node prior to providing information associated with the one or more of the group or the cryptographic policy to the requester.

5. The method of claim 1, further comprising receiving, by the server node, another request to update the encryption key;
   updating the encryption key; and
   initiating, in response to the updating, a synchronization process with another storage server to synchronize the updated encryption key.

6. The method of claim 1, further comprising determining, by the server node based on a public key of the requester node, that a role of the requester node is authorized to request creation of the encryption key, wherein the public key of the requester node is a Trusted Platform Module (TPM) key or a working key derived from the TPM key.

7. The method of claim 1, further comprising determining, by the server node, a role of the requester node based on a public key of the requester node, wherein the determination that the requester node is authorized to request creation of the encryption key is based at least on the role of the requester node.

8. The method of claim 7, further comprising verifying that the public key belongs to the requester node based on a cryptographic signature that accompanies the request.

9. A server node, comprising:
   memory;
   one or more processors;
   a key creation module stored on the memory and executable by the one or more processors to create an encryption key on behalf of a requester node in response to a determination that the requester node is authorized to request key creation; and
   a replication module stored on the memory and executable by the one or more processors to initiate replication of the encryption key on one or more other server nodes;
   wherein the key creation module is further configured to provide the encryption key to the requester node in response to receiving confirmation from the one or more other server nodes that the encryption key is replicated on the one or more other server nodes.

10. The server node of claim 9, wherein the replication includes receipt of confirmation from the one or more other server nodes that the encryption key is stored on the one or more other server nodes.

11. The server node of claim 9, wherein the key creation module is further configured to determine that the requester node is authorized to request key creation by verification that a public key of the requester node is included in a key list of authorized requesters.

12. The server node of claim 9, further comprising a group creation module stored on the memory and executable by the one or more processors to create a group on behalf of the requester node in response to a determination that the requester node is authorized to request group creation, and to provide information regarding the group to the requester node in response to replication, by the replication module, of the information on the one or more other server nodes.

13. The server node of claim 9, further comprising a key provision module stored on the memory and executable by the one or more processors to receive a request from another requester node to provide another encryption key, and to request the other encryption key from the one or more other server nodes in response to a determination that the other encryption key is not stored on the server node.

14. The server node of claim 9, further comprising:
   a key update module stored on the memory and executable by the one or more processors to update the encryption key on behalf of the requester node in response to a determination that the requester node is authorized to request key updates; and
   a synchronization module stored on the memory and executable by the one or more processors to synchronize the updated encryption key with the one or more other server nodes based at least on a version number of the updated encryption key.

15. The server node of claim 9 further comprising a Trusted Platform Module (TPM), and wherein the replication module utilizes a TPM key stored on the TPM, or a key derived from the TPM key, to encrypt communication to the one or more other server nodes.

16. One or more computer-readable storage media comprising a plurality of programming instructions executable by a computing device to cause the computing device to:

receive, from a requester node, a request to synchronize one or more encryption keys with the requester node, the request including a signature;

verify the signature of the request using a public key of the requester node stored in a list of public keys signed by a master server;

determine, based on the public key of the requester node, that the requester node has a designated role that allows it to request synchronization; and synchronize at least one of the one or more encryption keys in response to a determination that the requester node is authorized to request synchronization, the synchronization including providing first encryption keys requested by the requester node and storing second encryption keys provided by the requester node, the second encryption keys being different from the public key of the requester node.

17. The one or more computer-readable storage media of claim 16, wherein the plurality of programming instructions are further executable to periodically determine one or more other keys in a list of missing keys and to transmit a another request to synchronize the one or more other keys, the one or more server nodes including the requester node.

18. The one or more computer-readable storage media of claim 17, wherein the plurality of programming instructions are further executable to place the one or more other keys in the list of missing keys in response to one or more failed attempts to retrieve the one or more keys from the one or more server nodes.

19. The one or more computer-readable storage media of claim 17, wherein the one or more other server nodes are included in the list of public keys signed by the master server, and a key of the master server is also included in the list of public keys signed by the master server.

20. The one or more computer-readable storage media of claim 16, wherein the list of public keys are Trusted Platform Module (TPM) keys or keys derived from TPM keys.

* * * * *